Dec. 16, 1924.
E. GHIA
EMERGENCY BRAKE FOR CARS
Filed April 12, 1923
1,519,401
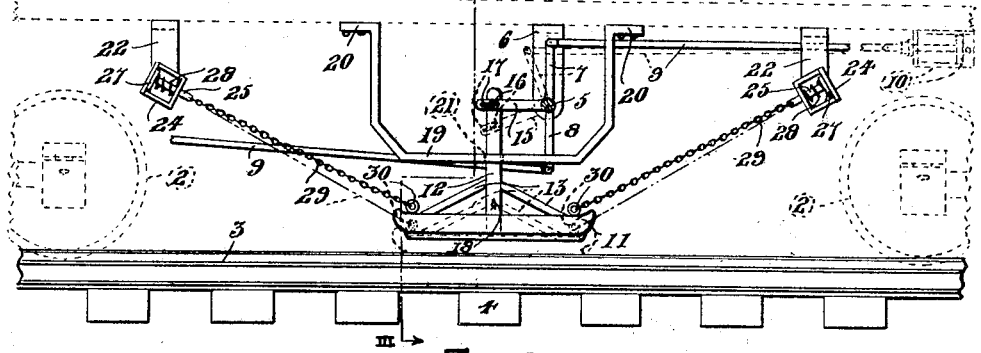
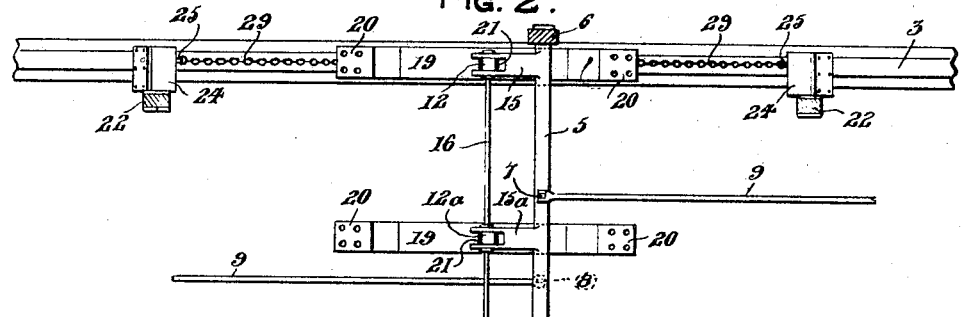
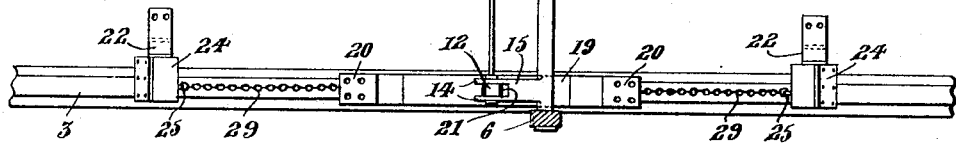
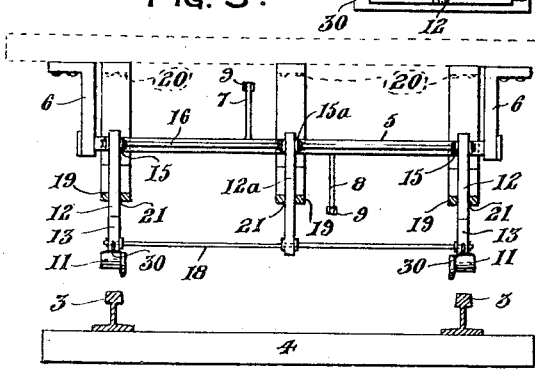
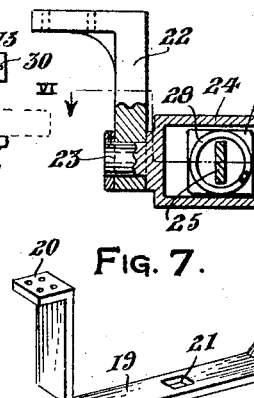
Inventor
E. Ghia
By J. R. Bryant
Attorney Patented Dec. 16, 1924.

1,519,401

UNITED STATES PATENT OFFICE.

EUGENE GHIA, OF BRISTOL, CONNECTICUT.

EMERGENCY BRAKE FOR CARS.

Application filed April 12, 1923. Serial No. 631,551.

*To all whom it may concern:*

Be it known that I, EUGENE GHIA, a citizen of the United States of America, residing at Bristol, in the county of Hartford and State of Connecticut, have invented certain new and useful Improvements in Emergency Brakes for Cars, of which the following is a specification.

This invention relates to certain new and useful improvements in emergency brakes for cars and provides a brake operating independently of the usual brakes that are applied to the wheels of the rolling stock and is adapted for frictional contact with the rails upon which the stock rolls to provide additional braking force and eliminating the dragging of the wheels that produce flat surfaces upon the tread portions thereof.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of an emergency brake for cars constructed in accordance with the present invention, a portion of a car and supporting wheels therefor being illustrated by dotted lines, Figure 2 is a top plan view of the emergency brake mechanism, Figure 3 is a vertical cross sectional view taken on line III—III of Fig. 1 showing the emergency brake shoes disposed above the track rails, Figure 4 is a top plan view of the emergency brake shoe, Figure 5 is a detail sectional view showing the spring housing associated with the suspension chain for the emergency brake shoe, Figure 6 is a detail sectional view taken on line VI—VI of Fig. 5, and Figure 7 is perspective view of one of the strap guides associated with the bars of the emergency brake mechanism.

In the accompanying drawing, there is illustrated by dotted lines in Fig. 1, a floor bottom 1 of a car disposed above the supporting wheels 2 therefor, that are in turn mounted upon the rails 3 supported on ties 4.

The emergency brake mechanism includes a cross shaft 5 disposed between the bottom 1 of the car and the rails 3 and being rotatably supported at its ends in depending bracket hangers 6 carried by the car bottom, oppositely projecting arms 7 and 8 being disposed above and below the shaft 5 for attachment to operating rods 9 as clearly illustrated in Figs. 1 and 2. The outer ends of the rods 9 terminate respectively adjacent the opposite ends of the car and are respectively connected to a piston and cylinder construction 10 operated by air pressure for rotating the cross shaft 5.

A brake shoe 11 is vertically shiftable above each rail 3, the same being preferably of the configuration more clearly illustrated in Figs. 1, 3 and 4, each brake shoe 11 carrying an upwardly directed perpendicular rod 12 located intermediate the ends thereof and braced by angle bars 13, the upper ends of the bars 12 extending between the bifurcated ends 14 of the arms 15 that are formed integral with and project laterally of the shaft 5 as clearly shown in Fig. 2, a cross shaft 16 having the upper ends of the rods 12 pivotally mounted thereon and extending through slotted openings 17 provided in the bifurcated ends of the arms 15 as clearly shown in Fig. 1. A cross rod 18 extends between the lower ends of the brake shoe arms 12 for further bracing the same and maintaining alinement of the brake shoes with the rails 3, the two rods 16 and 18 being further braced intermediate the ends by the links 12ª connected at its opposite ends thereto, while an arm 15ª projecting laterally of the shaft 5 intermediate the ends thereof has a connection with the rod 16 intermediate its ends as shown in Figs. 2 and 3. Guide brackets 19 for the several rods 12 and 12ª are associated therewith, the guides being of U-shaped formation as illustrated in Fig. 7 and being provided with end extensions 20 to be secured to the lower face of the car bottom 1 as shown in Fig 1 while the intermediate portions thereof are provided with openings 21 through which the rods 12 and 12ª extend as shown most clearly in Fig. 3.

To maintain the brake shoes 11 in their elevated inoperative positions as shown in Figs. 1 and 3, spring devices are associated therewith, and include an elevating device associated with each end of the brake shoe, a depending bracket 22 secured to the lower side of the car bottom 1 having the stem 23 of an open ended housing 24 swiveled therein, a rod 25 being slidable through an opening 26 in the side wall of the housing 24 and being provided upon the inner end thereof with a relatively large disk head 27 that is engaged by a coil spring 28 surrounding the rod 25 between the disk head and opposite wall of the housing 24. The outer end of the rod 25 has a chain connection 29 with the adjacent end of the brake shoe 11 as at 30.

The emergency brake shoes 11 are normally held elevated in spaced relation to the track rails 3 by the tensioned rod and chain connections 25 and 29, and the same are forcibly lowered against the tension of the springs 28 when either of the pump constructions 10 are operated for shifting the arms 7 or 8 upon the shaft 5, the arm connections 15 between the shaft 5 and brake shoe rods 12 causing the brake shoes to be lowered into engagement with the rail 3 to arrest movement of the car by the application of brake devices to the track rails. When air pressure in the pump devices 10 is reversed, the springs 28 and chain connections 29 with the brake shoes, cushion the elevation of the latter to their inoperative positions shown in Figs. 1 and 3, the brake shoes being guided in their movement by the guide frames 19 and rods connecting the same.

While there is herein shown and described the preferred embodiment of the present invention, it is nevertheless to be understood that minor changes may be made therein without departing from the spirit and scope of the invention as claimed.

What is claimed as new is:

1. A track brake mechanism for railroad cars including a rock shaft journalled transversely of a car, rock arms extending from said shaft and having bifurcated ends, two of said arms being spaced to lie over the rails whereon said car runs and the remaining arm being disposed between the two, each arm having a bifurcated end, a tie rod extending through the sides of said bifurcations, bars pivoted on said rod in said bifurcations and depending therefrom, guide yokes secured to the car and having guide openings through which said bars pass, a tie rod connecting the lower ends of said bars, and brake shoes carried by the outer bars.

2. A track brake mechanism for railroad cars including a rock shaft journalled transversely of a car, rock arms extending from said shaft and having bifurcated ends, two of said arms being spaced to lie over the rails whereon said car runs and the remaining arm being disposed between the two, each arm having a bifurcated end, a tie rod extending through the sides of said bifurcations, bars pivoted on said rod in said bifurcations and depending therefrom, guide yokes secured to the car and having guide openings through which said bars pass, a tie rod connecting the lower ends of said bars, brake shoes carried by the outer bars, and diagonally disposed yieldable means connecting the ends of said shoes and the car, said means being arranged to yield equally on both sides of the shoes whereby to assist in guiding the shoes to position on the rail.

In testimony whereof I affix my signature.

EUGENE GHIA.